(12) United States Patent
Renganathan et al.

(10) Patent No.: US 7,347,469 B1
(45) Date of Patent: Mar. 25, 2008

(54) HAND TOOL FOR MATERIAL GATHERING, LIFTING, AND MANIPULATION

(76) Inventors: Narendran Renganathan, 25 Princeton Rd., Burlington, MA (US) 01803; Gary R. Joyce, 941 Main St., Malden, MA (US) 02148; Chau Nguyen, 11 Spring Garden St., Dorchester, MA (US) 02125

(*) Notice: Subject to any disclaimer, the term of this patent is extended or adjusted under 35 U.S.C. 154(b) by 0 days.

(21) Appl. No.: 11/089,231

(22) Filed: Mar. 24, 2005

Related U.S. Application Data

(60) Provisional application No. 60/555,467, filed on Mar. 23, 2004.

(51) Int. Cl.
*A01B 1/02* (2006.01)
(52) U.S. Cl. .......................... 294/55; 294/25
(58) Field of Classification Search ............... 294/55, 294/257.1–257.9, 25; 15/236.01, 257.1–257.9; 56/400.11, 400.12; 172/371; 220/737; 224/218; D21/472
See application file for complete search history.

(56) References Cited

U.S. PATENT DOCUMENTS

| | | | |
|---|---|---|---|
| 567,087 A * | 9/1896 | Fitzgerald et al. ............. 294/11 |
| 1,712,451 A * | 5/1929 | Flint ........................... 312/117 |
| 2,546,113 A | 3/1951 | Spang |
| 3,837,696 A | 9/1974 | Dahlke |
| 3,840,261 A * | 10/1974 | Fulkerson et al. ............ 294/55 |
| 3,941,286 A | 3/1976 | Perkinson |
| 4,378,670 A | 4/1983 | Check et al. |
| D308,805 S | 6/1990 | Licht |
| 5,169,191 A | 12/1992 | Benz |
| 5,222,777 A | 6/1993 | Clonch |
| 5,359,840 A | 11/1994 | Costar |
| 6,058,510 A | 5/2000 | Breitenbach |
| 6,612,632 B2 | 9/2003 | Campbell |
| 6,643,892 B1 * | 11/2003 | Murphy ..................... 15/257.3 |

\* cited by examiner

*Primary Examiner*—Peter M. Cuomo
*Assistant Examiner*—Paul T Chin
(74) *Attorney, Agent, or Firm*—O'Connell Law Firm

(57) ABSTRACT

A hand tool with a substantially rigid blade member and a pocket fixed thereto for receiving at least a portion of a hand of a user. The pocket can have an open inner volume defined by upper and lower panels, first and second pocket side panels, and, possibly, one or more end panels. Pad members, which can have ridges and troughs disposed therealong, can be coupled to the upper and lower panels. A protuberance can cooperate with the upper panel to produce an arcuate proximal surface of the hand tool. A shield can provide protection, and a mitten portion can receive a hand of a user. A plurality of apertures in the blade member can enable a selective passage of material therethrough. A container arrangement can selectively engage an aperture in the blade member, and a tip extension member can selectively extend the blade member.

11 Claims, 12 Drawing Sheets

HAND TOOL FOR MATERIAL GATHERING, LIFTING, AND MANIPULATION

FIELD OF THE INVENTION

The present invention relates generally to hand tools. More particularly, this patent application discloses and protects a hand tool for enabling a user to gather, lift, and otherwise manipulate loose articles and other materials, such as leaves, dirt, and the like.

BACKGROUND OF THE INVENTION

It will be appreciated that the gathering, lifting, scooping, and other manipulation of loose material, such as leaves, dirt, and the like, commonly presents a tedious and time consuming task. For example, one seeking to clear leaves and the like from his or her yard surface normally must first rake or otherwise accumulate the same into a pile and then attempt to gather, lift, and deposit the loose materials into a refuse container, composting bin, or the like. The person can use his or her hands, but doing so is inefficient, messy and otherwise disadvantageous. Persons also often additionally or alternatively use a rake or shovel in combination with their hands or another implement, but doing so can be awkward, frustrating, and inefficient.

There are numerous other circumstances beyond yard work where the efficient gathering, lifting, scooping, and other manipulation of loose material represents a challenge to the person seeking to accomplish the same. For these and further reasons, it is clear that there is a need for an implement that can enable a person to gather, lift, scoop, and otherwise manipulate loose material in a convenient, efficient, and effective manner.

SUMMARY OF THE INVENTION

Advantageously, the present invention is founded on the most basically stated object of providing a hand tool that can enable the gathering, lifting, scooping, and other manipulation of loose material to be carried out conveniently, efficiently, and effectively.

A further object of embodiments of the invention is to provide a hand tool that enables a comfortable engagement and manipulation of the hand tool in relation to the fingers, hand, and arm of a user.

Another object of particular embodiments of the invention is to provide a hand tool that provides a measure of protection to a user's fingers, hand, and arm during usage of the hand tool.

Still another object of the manifestations of the invention is to provide a hand tool that can engage and be retained by a support surface, such as a wall surface, an article of clothing, or any other support surface.

An even further object of embodiments of the invention is to provide a hand tool that can enable a sifting and spreading of particulate material.

These and further objects and advantages of embodiments of the invention will become obvious not only to one who reviews the present specification and drawings but also to one who has an opportunity to make use of an embodiment of the instant invention for a hand tool for material gathering, lifting, and manipulation. However, it will be appreciated that, although the accomplishment of multiple objects in a single embodiment of the invention may be possible and indeed preferred, not all embodiments will seek or need to accomplish each and every potential object and advantage. Nonetheless, all such embodiments should be considered within the scope of the present invention.

In carrying forth these objects, one embodiment of the present invention for a hand tool for material gathering, lifting, and manipulation is founded on a substantially rigid blade member with a proximal end and a distal end. A pocket for receiving at least a portion of a hand of a user is fixed to the proximal end of the blade member. The blade member and the hand tool can be considered to have a material engaging side and an obverse side. Under this most basic arrangement, a hand of a user can be engaged with the pocket and the material engaging side of the blade member can be used in gathering, lifting, and manipulating material. One hand tool can be used alone. Alternatively, first and second hand tools can be respectively engaged with the left and right hands of a user for enabling a simultaneous usage thereof.

The open inner volume of the pocket can be defined by an upper panel disposed to the material engaging side of the blade member, a lower panel disposed opposite to the upper panel and to the obverse side of the blade member, a first and second pocket side panels, and, possibly, one or more end panels. It should be appreciated that, within the present disclosure, the term panel should not be considered to suggest a flat member, a unitary member, or any other limitation except as may be expressly provided herein. The several panels that form the pocket could in practice be formed unitarily from a single piece of material with no demarcation therebetween. The term wall may be used interchangeably with the term panel.

A protuberance, which can comprise a projection or a widened portion, can be disposed on the upper panel adjacent to a proximally disposed entrance of the pocket. The protuberance can be disposed over just a portion of the upper panel or it can communicate laterally across substantially the entire the upper panel. Where a projection is incorporated into the hand tool, a retaining pocket can be disposed within the protuberance for enabling a receipt and retention of articles.

To enable a comfortable manipulation of the hand tool by a user with his or her hand disposed in the pocket, the protuberance and the upper panel of the pocket can cooperate to produce an arcuate proximal surface of the hand tool. In certain manifestations, the hand tool can include a volume of resiliently compressible material whether by having a member of resiliently compressible material coupled thereto or by being partially or entirely formed from resiliently compressible material itself.

Under particular constructions of the hand tool, a pad member can be coupled to the inner surfaces of either or both of the upper panel and the lower panel of the pocket for enhancing the comfort to the user. The pad member or members can be generally smooth. Alternatively, a plurality of ridges and troughs, which can communicate longitudinally, can be disposed therein for engaging one or more fingers of a user. In other embodiments of the hand tool, one or both of the upper and lower panels can itself be formed with a plurality of ridges and troughs for engaging one or more fingers of a user. Again, the ridges and troughs can communicate longitudinally.

A shield can be fixed in relation to the pocket to provide protection to a hand of a user. The shield can be fixed to and project from the upper panel, the protuberance, or any other portion of the hand tool. The upper panel and the lower panel can be fixed in relation to one another. Alternatively, the upper panel can be adjustable in relation to the lower panel to enable a selective adjustment of a spacing between the upper panel and the lower panel thereby to change an effective size of the pocket. Certain embodiments of the hand tool can have a thumb receiver retained in relation to the pocket, such as adjacent to an outer surface of the upper panel. The thumb receiver can be fixed in place or laterally adjustable in relation to the pocket. Even further, the hand tool can further include a mitten portion that can be fixed relative to the pocket for receiving a hand of a user.

Embodiments of the hand tool can have a plurality of apertures in the blade member for enabling a selective passage of material therethrough. For example, the apertures can be relatively small for enabling a sifting of small particles from larger particles, for enabling a spreading of particulate matter, for enabling a retrieval of articles from a volume of liquid, and for any other such purpose. Alternatively, larger apertures can be provided for enabling a sifting and sorting of larger articles.

Even further, an aperture in the blade member can be provided for being engaged with a container arrangement, such as a bag, by any appropriate means, such as a threaded engagement. A tip extension member, which can be removably and replaceably coupled to the blade member, can selectively extend the effective length of the blade member. Additionally, a handle member, which can be fixed or adjustable in length and pivotable or non-pivotable, can be coupled to the blade member or the pocket by any effective means.

Of course, one should remain mindful that the foregoing discussion is designed merely to outline broadly certain important features of the invention to enable a bettered understanding of the detailed description that follows and to instill a better appreciation of the inventors' contribution to the art. Before any particular embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

As is the case with many inventions, the present invention for a hand tool for material gathering, lifting, and manipulation is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
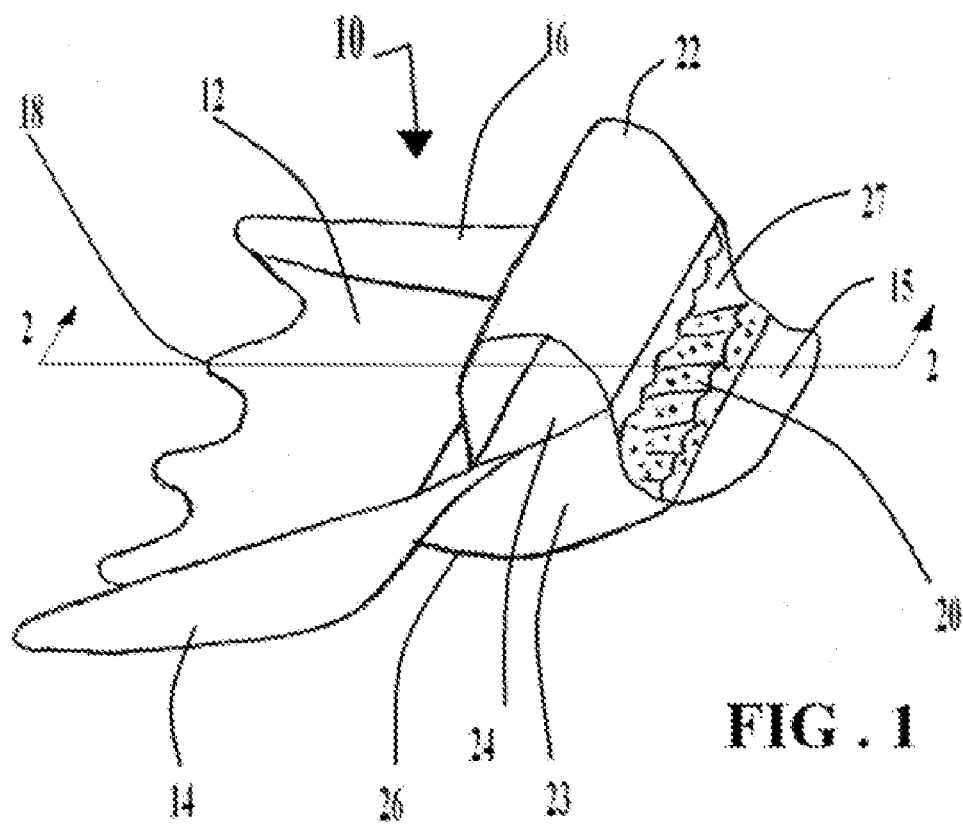
FIG. 1 is a perspective view of a hand tool according to the present invention.

With this in mind and looking more particularly to the accompanying figures, an exemplary embodiment of a hand tool for material gathering, lifting, and manipulation pursuant to the present invention is indicated generally at 10 in FIG. 1. The hand tool 10 is founded on a generally rigid blade member 12, which may alternatively be termed a spade portion, a shovel portion, or a scoop portion. The blade member 12 can have first and second side panels 14 and 16 coupled thereto, such as by being fixed to the blade member 12 or by being formed integrally therewith. The blade member 12 can have a tip 18 at a distal end thereof and a means for engaging a user's hand at a proximal end thereof. The tip 18 can be straight and smooth, serrated as depicted in FIG. 1, or otherwise configured. The blade member 12 and the hand tool 10 in general can be considered to have a material engaging surface to the side of the first and second side panels 14 and 16 and an obverse side.

Figure 2A:
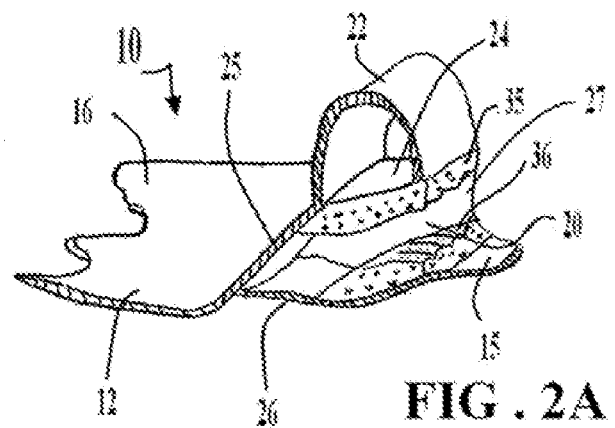
FIG. 2A is a cross sectional perspective view of the hand tool taken along the line 2-2 in FIG. 1.

A means for engaging the user's hand can comprise a pocket 20 with a proximally disposed entrance. The pocket 20 can be formed in any appropriate manner. In the present embodiment, the pocket 20 has an open inner volume defined by an upper panel 24, a lower panel 15, an upper end panel 25, a lower end panel 26, a first pocket side panel 23, and a second pocket side panel 27. The panels 24, 15, 25, 26, 23, and 27 can be formed separately and joined together or integrally, such as by molding or any other effective method. One or more of the upper panel 24, the lower panel 15, the upper end panel 25, or the lower end panel 26 can be formed by or form a portion of the blade member 12. For example, as FIG. 2A shows most clearly, the upper end panel 25 in the depicted embodiment forms a portion of the blade member 12.

Figure 2B:
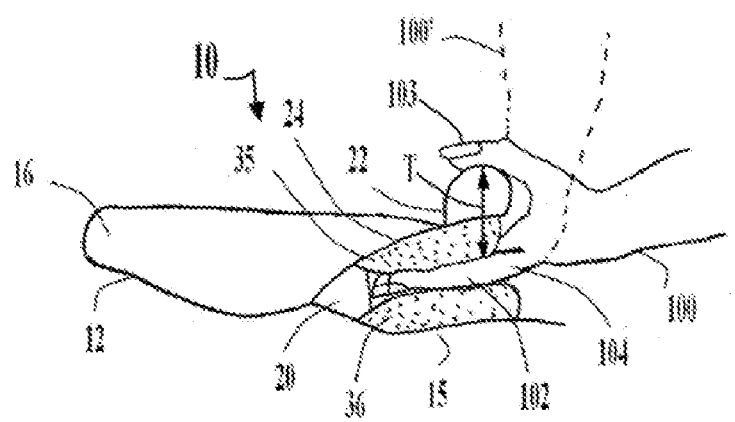
FIG. 2B is a cross sectional perspective view of the hand tool taken along the line 2-2 in FIG. 1.
Figure 10:
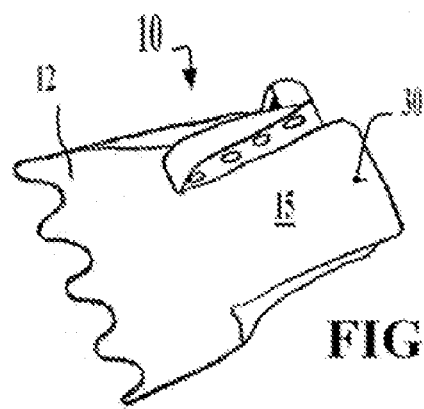
FIG. 10A is a perspective view of an even further hand tool under the present invention.
FIG. 10B is a view in rear elevation of a hand tool according to the instant invention.
FIG. 10C is a view in rear elevation of a variation of a hand tool according to the instant invention.
Figure 10:
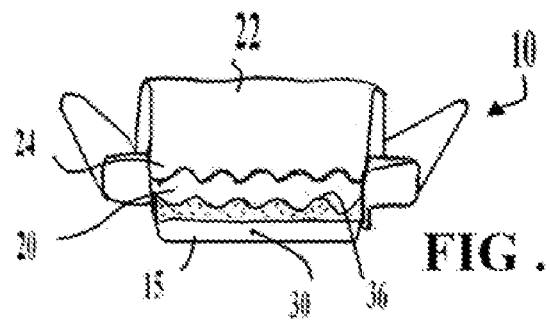
Figure 10:
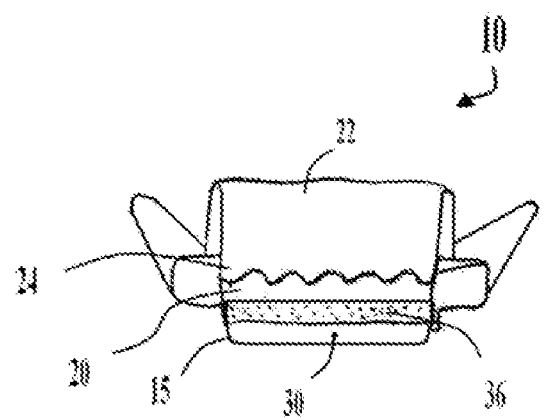

The pocket 20 can incorporate padding in relation to either or both of the upper and lower panels 24 and 15. For example, as is shown in FIGS. 2A and 2B, upper and lower pad members 35 and 36 can be fixed to or possibly formed integrally with the upper and lower panels 24 and 15. The pad members 35 and 36 can be ergonomically formed, such as by having a plurality of longitudinal ridges and troughs, to engage a user's fingers. Alternatively, as is shown in FIG. 10C in relation to the lower pad member 36, for example, the pad members 35 and 36 could be formed without ridges and troughs. In either case, the upper and lower pad members 35 and 36 could be contoured, such as by having a longitudinally communicating curve, to enable a comfortable disposition of a user's hand.

In other constructions, the pocket 20 can be crafted for ergonomically receiving a user's hand by a contouring of the upper and lower panels 24 and 15. For example, as is shown in FIGS. 10B and 10C, the upper panel 24 itself can be contoured by have a plurality of longitudinal ridges and troughs formed therein, such as by molding or any other effective method. In FIG. 10B, the upper panel 24 has a plurality of longitudinal ridges and troughs as does a lower pad member 36 that is fixed to the lower panel 15. In FIG. 10C, the upper panel 24 has a plurality of longitudinal ridges and troughs while a lower pad member 36 affixed to the lower panel 15 does not.

A protuberance 22 or broadened portion can be disposed at the proximal end of the pocket 20, such as adjacent to the proximal end of the upper panel 24 for enhancing the comfort to the user and the user's ability to grip and control the hand tool 10. As in the present embodiment, the protuberance 22 can project from the outer surface of the upper panel 24 from adjacent to the proximal end thereof. The protuberance 22 could be disposed over just a portion of the upper panel 24. Alternatively, as in the present construction, the protuberance 22 could communicate laterally across substantially the entire outer surface of the upper panel 24.

As FIG. 2B shows most clearly, the protuberance 22 can cooperate with the inner surface of the upper panel 24 and, additionally or alternatively, any upper pad member 35 that may be incorporated into the hand tool 10 to provide a generally smooth surface. A user's fingers 102, hand 104, and arm 100 can contact the smooth surface as the hand tool 10 and the user's arm 100 are pivoted in relation to one another between, for example, the first position of the arm 100 and the second position of the arm 100'.

In certain embodiments, the protuberance 22 and possibly the upper wall 24 and the upper pad member 35 can establish an effective thickness T over all or a portion thereof that can ensure a smooth and ergonomically desirable surface for engaging the user's hand 104, arm 100, fingers 102, and thumb 103. Additionally, the protuberance 22 and possibly the upper wall 24 and the upper pad member 35 can have an engaging surface sized with an engaging length L for engaging a user's hand 104 from the tip of the user's fingers 102 to the tip of the user's thumb 103 most comfortably.

In practice, the user's fingers 102 and thumb 103 could be partially or completely received into the open inner volume of the pocket 20. Alternatively, as is shown in FIG. 2B, the user's thumb 103 could be disposed outside of the open inner volume of the pocket 20, such as by overlying the protuberance 22. Under such a use of the hand tool 10, the protuberance 22 could act as a thumb rest. To accommodate such a gripping, the protuberance 22 and the upper panel 24, which can be considered to include the pad member 35 where one is included, can establish an effective diameter or thickness T calibrated to suit the intended user. The optimal effective thickness T will, of course, depend on the user and can vary widely under the invention. Based on statistical research, presently contemplated embodiments of the hand tool 10 can, by way of example and not limitation, be crafted with an effective thickness T as small as 0.5 inches and possibly smaller and as great as 5.25 inches and possibly larger.

The protuberance 22 can pursue numerous different configurations under the present invention. For example, as shown in FIG. 2O, the protuberance 22 can be generally tubular or cylindrical and can be fixed to the upper panel 24. A support wedge 33 can stabilize the protuberance 22 and can prevent the accumulation of debris in relation thereto.

The proximal end of the lower panel 15 can extend a distance past the entrance to the pocket 20 to provide a measure of protection to the user's hand 104, arm 100, and fingers 102. Additionally, as is shown in relation to the embodiment of the hand tool 10 of FIG. 8, a shield 40 could project from the upper panel 24 or from the protuberance 22 for providing protection to the user's hand 104, fingers 102, and arm 100 (not shown in FIG. 8).

Figure 3:
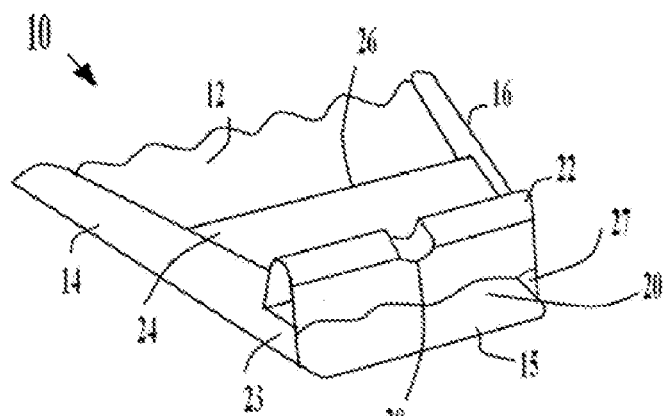
FIG. 3 is a perspective view of another hand tool pursuant to the instant invention.

In FIG. 3, a hand tool 10 is shown wherein the blade member 12 is formed integrally with the lower panel 15. An upper panel 24 is maintained in spaced relation relative to the lower panel 15 by first and second pocket side panels 23 and 27, which are formed integrally with the first and second side panels 14 and 16. Together, the lower panel 15, the upper panel 24, the first and second pocket side panels 23 and 27, and upper end panel 26 define the open inner volume of the pocket 20. An aperture, groove 28, or other arrangement, which can be threaded, is provided for engaging and retaining a rod member (not shown). As such, the hand tool 10 can, by way of example, be retained relative to a handle portion of a rake, shovel, or other implement for temporary storage and/or to be manipulated thereby.

Figure 4:
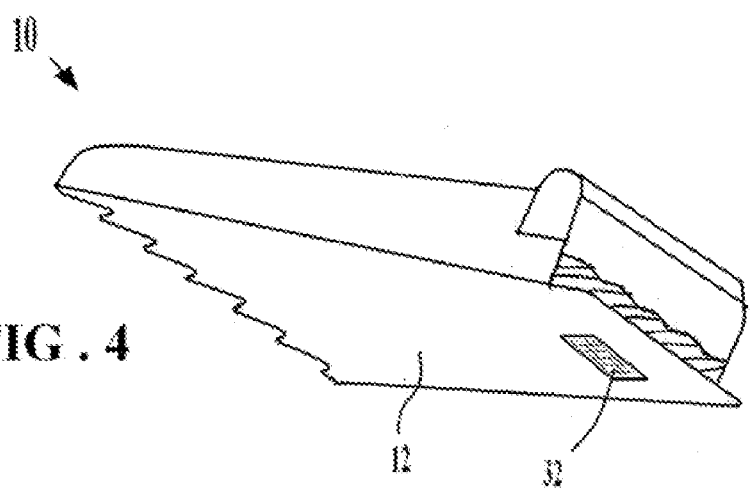
FIG. 4 is a perspective view of still another hand tool under the instant invention.

In FIGS. 10A, 10B, and 10C, the hand tool 10 further includes an aperture 30, which can be disposed in the blade member 12, for enabling the hand tool 10 to engage a hook (not shown) or the like for hanging and storage. The embodiment of the hand tool 10 of FIG. 4 further incorporates a means, such as a strip of hook and/or loop material 32 adhered to the blade member 12, for enabling the hand tool 10 to be retained relative to a given structure, such as a wall structure, an article of clothing, or the like.

Figure 5:
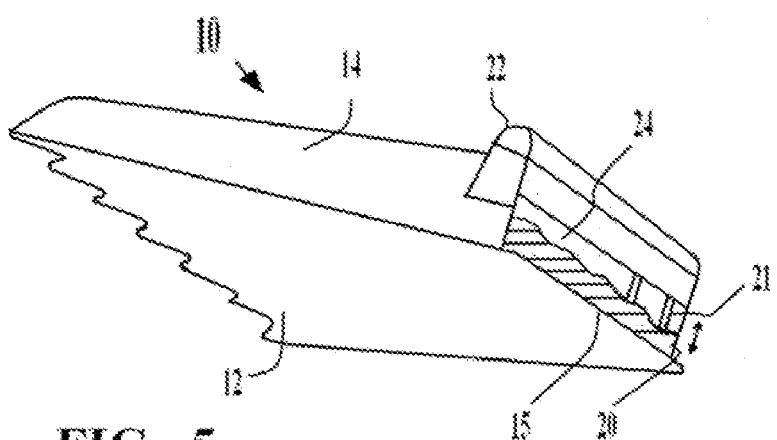
FIG. 5 is a perspective view of a further hand tool pursuant to the instant invention.

In the hand tool 10 of FIG. 5, the upper panel 24 is adjustable in relation to its spacing from the lower panel 15 by any appropriate means, such as tracks 21. With such an adjustability, the hand tool 10 can be adapted for users having differently sized hands by a selective adjustment of the spacing between the upper panel 24 and the lower panel 15 to change the effective size of the pocket 20.

Figure 6:
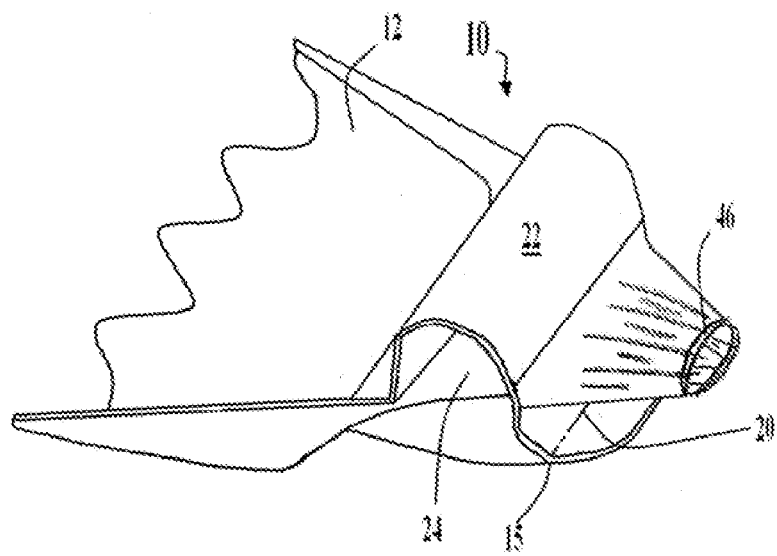
FIG. 6 is a perspective view of an additional hand tool as disclosed herein.

In the embodiment of FIG. 6, the hand tool 10 incorporates a mitten portion 46 that is retained adjacent to and/or partially within the pocket 20. The mitten portion 46 can comprise a complete mitten structure, which can have fingers like a glove or no fingers as in a typical mitten, that can have a portion thereof retained within the pocket 20. Alternatively, the glove or mitten portion 46 can comprise just a portion of a glove or mitten with the structure terminating at or near the mouth of the pocket 20.

Figure 8:
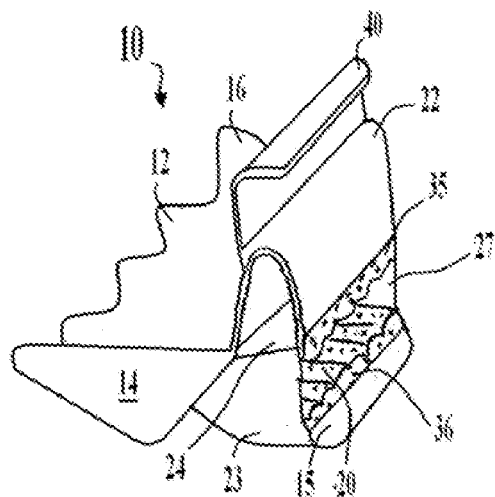
FIG. 8 is a perspective view an a further hand tool pursuant to the invention disclosed herein.
Figure 7:
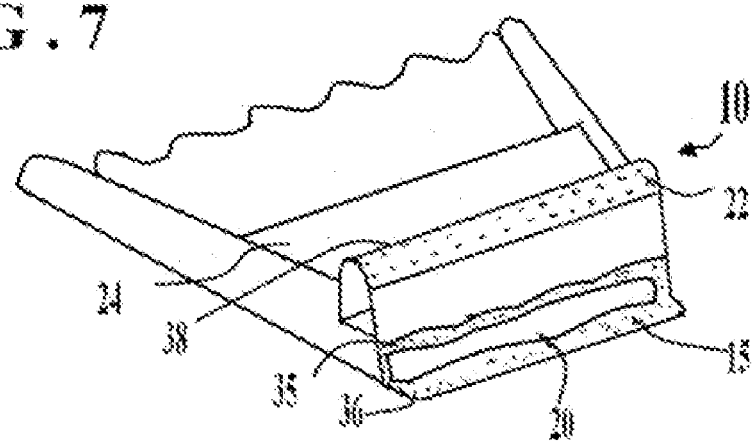
FIG. 7 is a perspective view of yet another hand tool.

In the embodiment of FIG. 8, added comfort and the ability to accommodate variations in size of a user's hand are again gained by upper and lower resiliently compressible members 35 and 36. The upper and lower resiliently compressible members 35 and 36 can merely line the entrance of the pocket 20 or can be disposed along all or substantially all of the upper and lower panels 24 and 15 respectively and, possibly, along the first and second pocket side panels 23 and 27. The upper and lower resiliently compressible members 35 and 36 can compress as necessary to receive a user's hand. As shown in relation to the embodiment of FIG. 7, an ergonomic gripping and/or cushioning member 38 of resiliently compressible material can be applied to the protuberance 22. Alternatively, the ergonomic gripping and/or cushioning member 38 could form all or a portion of the protuberance 22.

Figure 9:
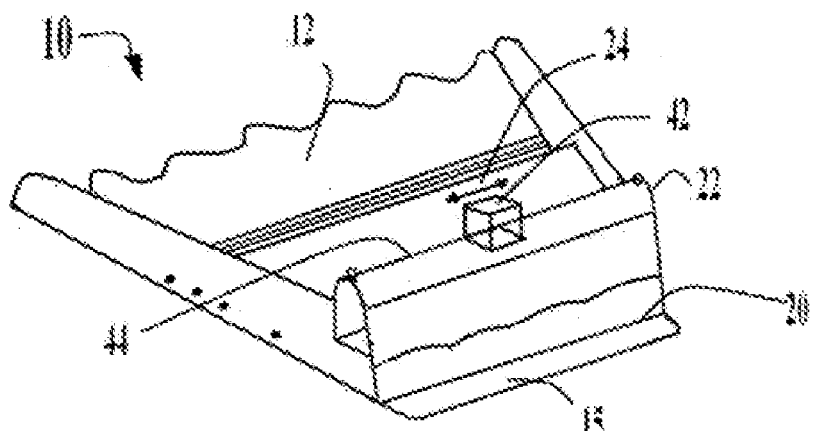
FIG. 9 is a perspective view of still another embodiment of the present invention for a hand tool.

In the hand tool 10 of FIG. 9, a thumb receiver 42 is retained adjacent to the protuberance 22 and the upper panel 24. The thumb receiver 42 could be fixed in place. Alternatively, as is shown in FIG. 9, an adjustment means could be provided for enabling an adjustment of the relative location of the thumb receiver 42. While numerous adjustment means would readily occur to one skilled in the art after reading this disclosure, the adjustment means in FIG. 9 comprises a threaded engagement between the thumb receiver 42 and a retaining rod 44. Under this arrangement, the thumb receiver 42 can be moved laterally by a relative rotation between the retaining rod 44 and the thumb receiver 42.

Figure 11:
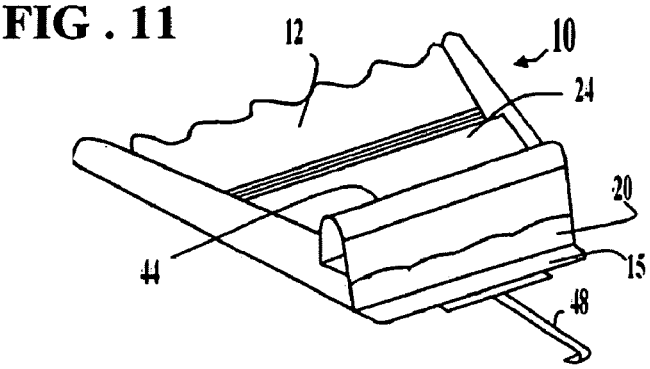
FIG. 11 is a perspective view of another hand tool as disclosed herein.
Figure 12:
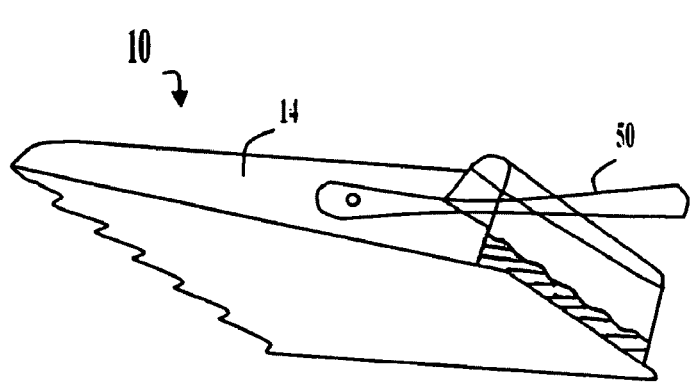
FIG. 12 is a perspective view of an even further hand tool pursuant to the present invention.

As shown, by way of example, in FIG. 11, the hand tool 10 can have a hook portion 48 retained relative thereto, such as relative to the lower panel 15, for enabling a hooking of the hand tool 10 relative to an external structure (not shown), such as a user's clothing, a wall, a barrel, or any other structure. FIG. 12 depicts a variation of the hand tool 10 wherein a strap 50 is retained relative thereto, such as relative to the first side panel 14, for enabling that hand tool 10 to be retained and supported.

Figure 13:
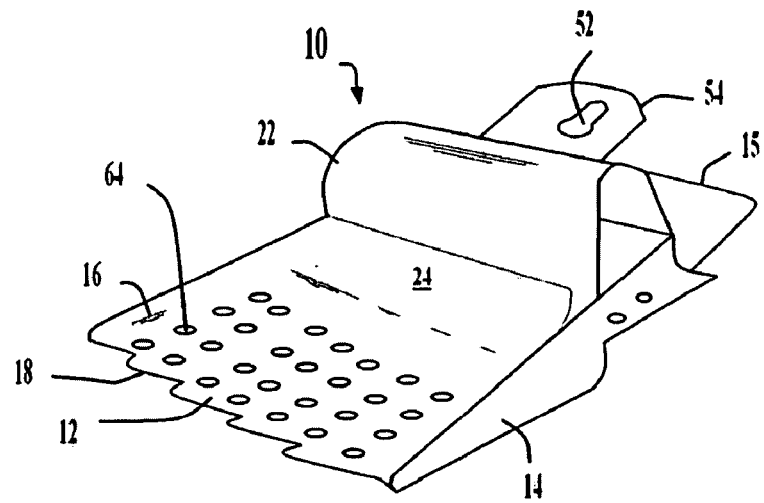
FIG. 13A is a perspective view of an additional hand tool according to the instant invention.
FIG. 13B is a perspective view of an even further hand tool as disclosed herein.
Figure 13:
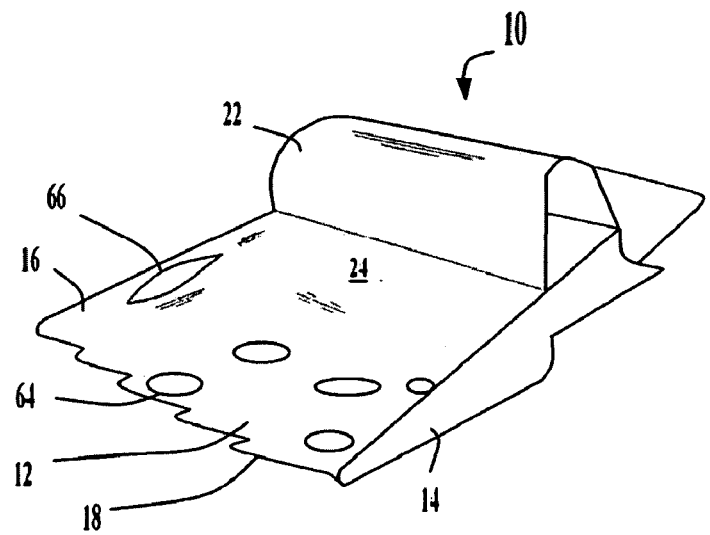

Turning to FIGS. 13A and 13B, one sees that a plurality of apertures 64 can be incorporated into the blade member 12. The apertures 64 can be of substantially any size. For example, the apertures 64 can be relatively small and calibrated as in FIG. 13A to allow only liquids and small particulate matter to pass through the blade member 12. Such an embodiment could enable, for example, a handling of liquid soaked materials, a removal of materials from a volume of liquid, and a sifting of particles larger than the size of the apertures 64 from particles smaller than the size of the apertures. Furthermore, the apertures 64 can enable a spreading of particulate matter, such as seeds, sand, ice melting material, or any other particulate matter.

Alternatively, the apertures 64 can be relatively large as in FIG. 13B for enabling a passage and sifting of larger particles. Where desirable, apertures 66 can also be incorporated in one or both of the first and second side panels 14 and 16. Of course, the configuration, number, and shape of the apertures 64 can vary. By way of example, the apertures 64 could alternatively comprise slots, rectangular openings, or any other shape. FIG. 13A depicts a further aspect of the invention in the form of a keyhole slot aperture 52 disposed in a tab portion 54 that is fixed to the lower panel 15. By use of the slot aperture 52, the hand tool 10 can be retained relative to a nail or the like (not shown).

Figure 14:
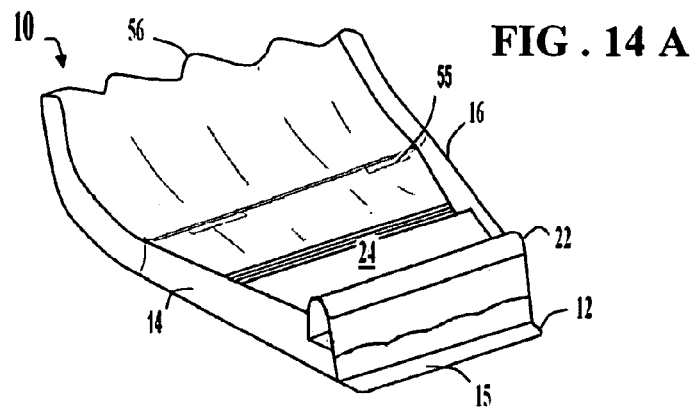
FIG. 14A is a perspective view of still another hand tool under the invention disclosed herein.
FIG. 14B is a perspective view of an additional hand tool under the invention disclosed herein.
Figure 14:
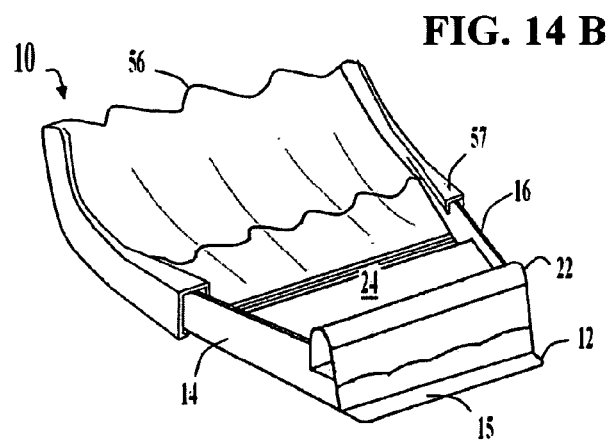

Looking to FIG. 14, one sees that a hand tool 10 according to the present invention can include a concave, extended tip portion 56. The extended tip portion 56 can be integrally formed by a curved end portion of the blade member 12, possibly in combination with integrally formed portions of the first and second side panels 14 and 16. Alternatively, as in FIG. 14A, the extended tip portion 56 could comprise a separate member for being removably and replaceably received coupled to a tip 18 of a hand tool 10 of the type previously described by, for example, a frictional snap engagement mechanism 55. Still further, as in FIG. 14B, the extended tip portion 56 could be extendable and retractable in relation to the blade member 12 by a sliding arrangement 57.

Figure 15:
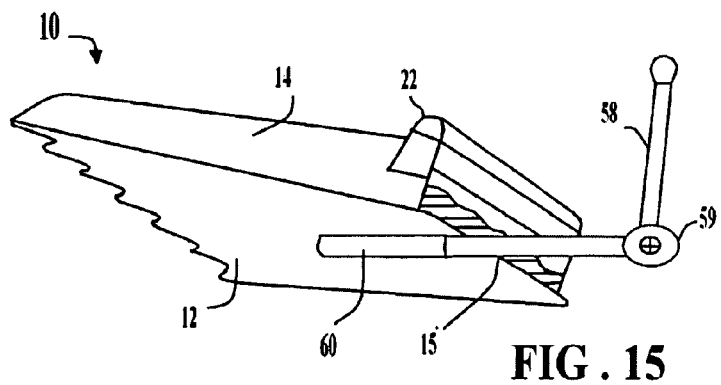
FIG. 15 is a perspective view of yet another hand tool pursuant to the present invention.

In an even further variation, the hand tool 10 can have a handle member 58 retained relative thereto for enabling an alternative method for manipulating the hand tool 10. The handle member 58 could be fixed relative to the hand tool 10, such as by being secured to the blade member 12. Alternatively, as in FIG. 15, a portion of the handle member 58 could be removably and replaceably retained relative to the hand tool 10, such as by being slidably received into a retaining sleeve 60 that can be fixed to the underside of the blade member 12 or the lower panel 15. The handle member 58 can be straight. Alternatively, the handle member 58 can have a bend therein, such as by the incorporation of an elbow 59. The elbow 59 can be fixed or pivotable.

Figure 16:
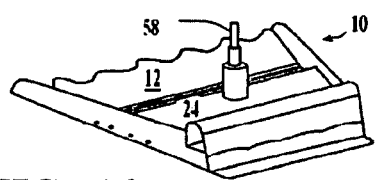
FIG. 16 is a perspective view of an additional hand tool as disclosed herein.
Figure 17:
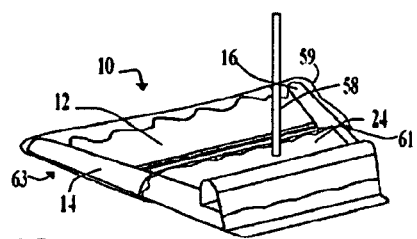
FIG. 17 is a perspective view of an even further hand tool pursuant to the instant invention.

The handle member 58 could alternatively be retained relative to the upper panel 24. For example, as is shown in FIG. 16, a handle member 58, which in this embodiment is telescoping, could be fixed relative to the pocket panel 24 in a generally perpendicular relationship. Alternatively, as is shown in FIG. 17, a handle member 58 of a fixed length could be secured, again generally perpendicularly, relative to the upper panel 24. FIG. 17 additionally shows that the hand tool 10 could include a sleeve arrangement 63, which could be removably received over the blade member 12 and the first and second side panels 14 and 16. The sleeve arrangement 63, which could be opaque or transparent as in FIG. 17, can include a body portion 59 and a collar portion 61. The collar portion 61 can be elasticized to engage the hand tool 10 frictionally.

Figure 18:
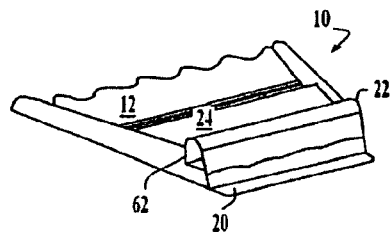
FIG. 18 is a perspective view of another hand tool under the instant invention.

An even further variation of the hand tool 10 is shown in FIG. 18. There, the hand tool 10 again has a blade member 12, first and second side panels 14 and 16, and an upper panel 24. A protuberance 22 again is provided for better enabling a control and manipulation of the hand tool 10. In this embodiment, however, a retaining pocket 62 is provided within the protuberance 22 for enabling, by way of example, a retention and storage of separate elements (not shown), such as a cleaning brush, gloves, or the like.

Figure 19:
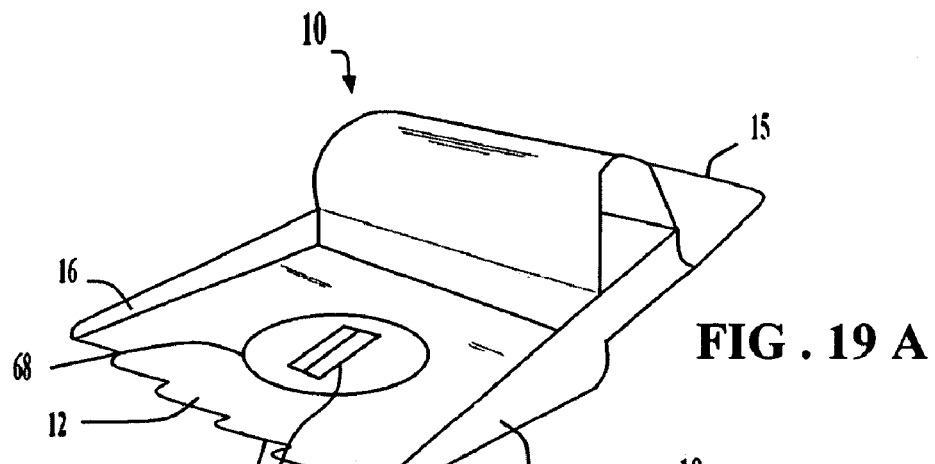
FIG. 19A is an upper perspective view of still another hand tool pursuant to the present invention.
FIG. 19B is a lower perspective view of the hand tool of FIG. 19A.
Figure 19:
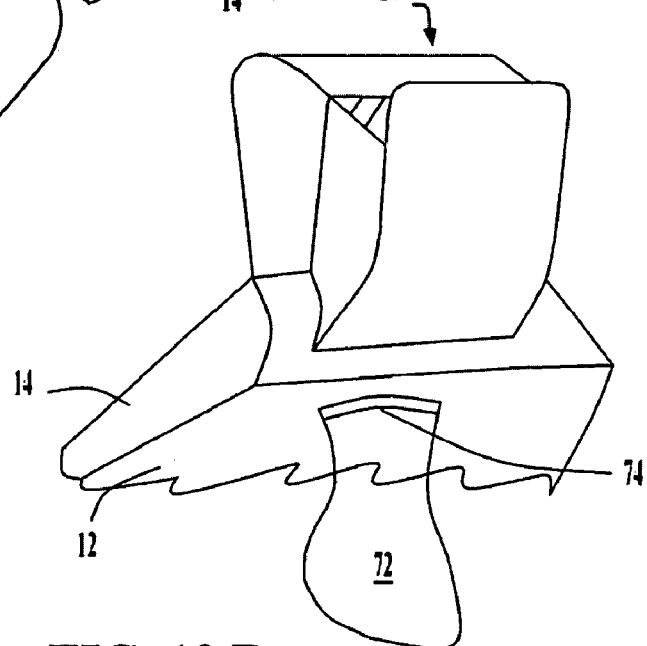
Figure 20:
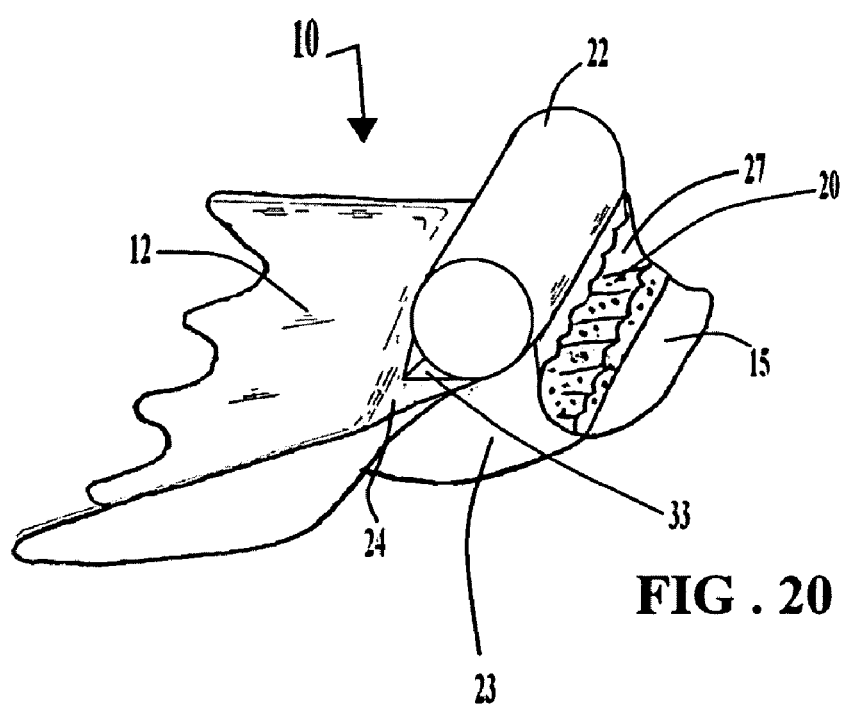
FIG. 20 is a perspective view of a further hand tool pursuant to the instant invention.

FIGS. 19A and 19B depict a hand tool 10 with a large drain aperture 68 therein. The drain aperture 68 can be selectively sealed by a cap 70, which can be threadedly engaged therewith. A collection container 72, which can be a bag or any other effective device, can be coupled to the drain aperture 68, such as by a threaded coupling 74. So constructed, the hand tool 10 can be used for a variety of purposes, including bagging debris for disposal, accumulating material for storage, or any other purpose.

Of course, the hand tool 10 and the components thereof could be formed of a wide variety of materials and with a wide variety of dimensions. For example, the blade member 12, the first and second side panels 14 and 16, the upper panel 24, and further components of the hand tool 10 could well be formed of metal, plastic, wood, and any other effective material or combination thereof. Likewise, it will be appreciated that the depicted sizes and proportions of the blade member 12, the first and second side panels 14 and 16, the upper panel 24, the lower panel 15, the pocket 20, and each of the other structures and portions of the hand tool 10 could vary substantially infinitely within the scope of the invention.

One making use of an embodiment of the hand tool 10 can do so by engaging his or her hand with the pocket 20, such as by inserting all or part of his or her hand therein. The user could use just one hand tool 10 or a hand tool 10 in relation to each hand. The hand tool 10 can then be used for substantially any purpose, and that purpose can depend at least in part on the particular embodiment or embodiments of which the user is possessed. The user could, for example, use the blade member 12 or members 12 to scoop, lift, and otherwise manipulate any material including, by way of example, leaves, dirt, and other debris. The user could simply move the material from one location or disposition to another. Alternatively, the user could employ the hand tool 10 or hand tools 10 to lift and deposit the material into a container, possibly for disposal. The user can pivot the hand tool 10 or hand tools 10 in relation to his or her arm 100 in a comfortable and effective manner to enable a most efficient manipulation of particulate and other matter. Of course, as previously described, variations of the hand tool 10 will enable further and different tasks.

With a plurality of exemplary embodiments and details of the present invention for a hand tool 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventors. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof.

We claim as deserving the protection of Letters Patent:

1. A hand tool for material gathering, lifting, and manipulation comprising:
    a substantially rigid blade member with a proximal end and a distal end; and
    a pocket for receiving at least a portion of a hand of a user wherein the pocket is fixed to the blade member and wherein the pocket has an open inner volume and an entrance;
    wherein the hand tool has a first end and a second end, wherein the distal end of the rigid blade member defines the second end of the hand tool, and wherein the entrance of the pocket is adjacent to and opens to the first end of the hand tool and the pocket communicates distally from adjacent to the first end of the hand tool;
    wherein the open inner volume of the pocket is defined by an upper panel disposed to the material engaging side of the blade member, a lower panel disposed opposite to the upper panel and to the obverse side of the blade member, a first pocket side panel, and a second pocket side panel disposed opposite to the first pocket side panel;
    a protuberance disposed on the upper panel of the pocket adjacent to the entrance of the pocket wherein the protuberance comprises a projection from the upper panel of the pocket wherein the protuberance and the upper and lower panels of the pocket are fixed in relation to one another;
    a pad member retained relative to an interior surface of at least one of the upper panel or the lower panel of the pocket;
    wherein the blade member and the hand tool have a material engaging side and an obverse side whereby the material engaging side of the blade member of the hand tool can be used in gathering, lifting, and manipulating material with a hand of a user engaged with the pocket.

2. The hand tool of claim 1 wherein the open inner volume of the pocket is further defined by at least one end panel.

3. The hand tool of claim 1 wherein the pad member has a plurality of ridges and troughs therein for engaging one or more fingers of a user.

4. The hand tool of claim 1 wherein the protuberance communicates laterally across substantially the entire the upper panel.

5. The hand tool of claim 4 wherein the protuberance and the upper panel of the pocket cooperate to produce an arcuate proximal surface of the hand tool.

6. The hand tool of claim 5 wherein the protuberance and the upper panel of the pocket cooperate to produce an effective thickness of between 0.5 inches and 5.25 inches.

7. The hand tool of claim 1 wherein the protuberance includes a volume of resiliently compressible material.

8. The hand tool of claim 1 further comprising a retaining pocket disposed within the protuberance wherein the protuberance and the retaining pocket communicate from adjacent to the first pocket side panel to the second pocket side panel.

9. A hand tool for material gathering, lifting, and manipulation comprising:
    a substantially rigid blade member with a proximal end and a distal end; and
    a pocket for receiving at least a portion of a hand of a user wherein the pocket is fixed to the blade member and wherein the pocket has an open inner volume and an entrance;
    wherein the hand tool has a first end and a second end, wherein the distal end of the rigid blade member defines the second end of the hand tool, and wherein the entrance of the pocket is adjacent to and opens to the first end of the hand tool and the pocket communicates distally from adjacent to the first end of the hand tool;
    wherein the open inner volume of the pocket is defined by an upper panel disposed to the material engaging side of the blade member, a lower panel disposed opposite to the upper panel and to the obverse side of the blade member, a first pocket side panel, and a second pocket side panel disposed opposite to the first pocket side panel;
    a protuberance disposed on the upper panel of the pocket adjacent to the entrance of the pocket wherein the protuberance comprises a projection from the upper panel of the pocket wherein the protuberance and the upper and lower panels of the pocket are fixed in relation to one another;
    wherein the blade member and the hand tool have a material engaging side and an obverse side whereby the material engaging side of the blade member of the hand tool can be used in gathering, lifting, and manipulating material with a hand of a user engaged with the pocket; and
    wherein at least one of the upper and lower panels of the pocket has a plurality of ridges and troughs formed therein for engaging one or more fingers of a user.

10. A hand tool for material gathering, lifting, and manipulation comprising:

a blade member with a proximal end and a distal end; and a pocket for receiving at least a portion of a hand of a user wherein the pocket is fixed to the proximal end of the blade member, wherein the pocket has an open inner volume and an entrance, wherein the open inner volume of the pocket is defined by an upper panel disposed to the material engaging side of the blade member, a lower panel disposed opposite to the upper panel and to the obverse side of the blade member, a first pocket side panel, and a second pocket side panel disposed opposite to the first pocket side panel;

wherein the hand tool has a first end and a second end, wherein the distal end of the rigid blade member defines the second end of the hand tool, and wherein the entrance of the pocket is adjacent to the first end of the hand tool and the pocket communicates distally from adjacent to the first end of the hand tool;

a resiliently compressible pad member coupled to an interior surface of at least one of the upper panel or the lower panel of the pocket; and a protuberance disposed on the upper panel of the pocket adjacent to the entrance of the pocket wherein the protuberance and the upper panel of the pocket cooperate to produce an arcuate proximal surface of the hand tool and wherein the protuberance and the upper and lower panels of the pocket are fixed in relation to one another;

wherein the blade member and the hand tool have a material engaging side and an obverse side whereby the material engaging side of the blade member of the hand tool can be used in gathering, lifting, and manipulating material with a hand of a user engaged with the pocket.

11. The hand tool of claim 10 wherein the pad member has a plurality of ridges and troughs therein for engaging one or more fingers of a user.

* * * * *